US 6,533,137 B2

(12) United States Patent
Gervais

(10) Patent No.: US 6,533,137 B2
(45) Date of Patent: Mar. 18, 2003

(54) CONTAINER FOR STORING AND HANDING BULK MATERIAL

(76) Inventor: Richard Gervais, 91 Domaine Lafortune, Saint-Thomas-de-Joliette, Quebec (CA), J0K 3L0

( * ) Notice: Subject to any disclaimer, the term of this patent is extended or adjusted under 35 U.S.C. 154(b) by 0 days.

(21) Appl. No.: 09/937,575

(22) PCT Filed: Apr. 18, 2001

(86) PCT No.: PCT/CA01/00542

§ 371 (c)(1),
(2), (4) Date: Sep. 25, 2001

(87) PCT Pub. No.: WO01/79095

PCT Pub. Date: Oct. 25, 2001

(65) Prior Publication Data

US 2002/0185493 A1 Dec. 12, 2002

(51) Int. Cl.[7] ............................................... B65D 88/16
(52) U.S. Cl. .................... 220/9.4; 220/1.6; 220/495.05; 220/62.21
(58) Field of Search ............................. 220/1.6, 495.05, 220/9.4, 62.21; 222/105, 95, 181.1, 183, 185.1; 414/267, 304, 539, 808, 810, 811, 812, 814

(56) References Cited

U.S. PATENT DOCUMENTS

| 3,198,390 A | * | 8/1965 | Beckman et al. | ........ 206/459.5 |
| 4,449,646 A | * | 5/1984 | Bonerb et al. | .............. 222/105 |
| 4,541,765 A | | 9/1985 | Moore | ........................ 414/267 |
| 5,967,579 A | * | 10/1999 | Hebert | ....................... 222/105 |

FOREIGN PATENT DOCUMENTS

| DE | 3604975 | 8/1987 |
| DE | 19733812 | 2/1999 |
| GB | 2121467 | 12/1983 |
| JP | 6181322 | 4/1986 |

* cited by examiner

*Primary Examiner*—Stephen Castellano
(74) *Attorney, Agent, or Firm*—Donald R. Boys; Central Coast Patent Agency, Inc.

(57) ABSTRACT

A container for storing, handling and transporting bulk material is disclosed. The container comprises a flexible bag which has a top portion provided with a filling inlet for filling the bag, and a bottom portion provided with a discharging outlet for discharging the bag. The container also comprises a frame for supporting and containing the bag and several stretchable bands connected to the frame for upwardly and resiliently biasing side walls of the bag. The biasing mechanism is automatically engaged during the unloading process of the bag, thus eliminating practically any human intervention.

17 Claims, 5 Drawing Sheets

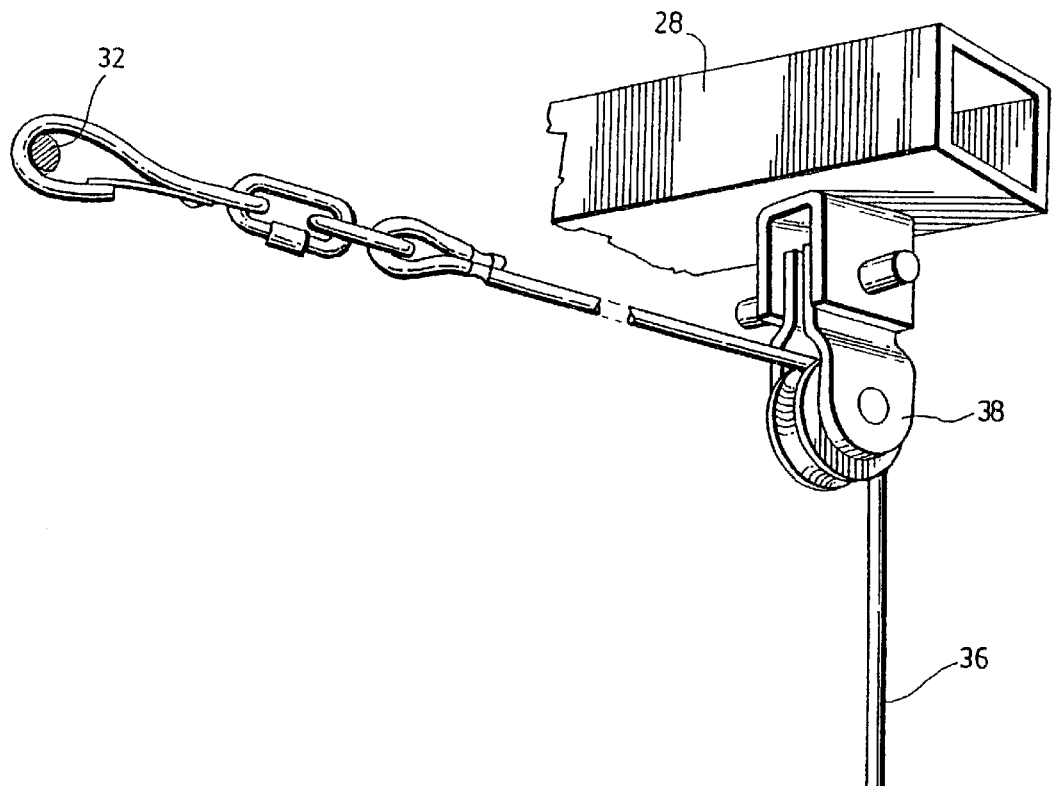
FIG. 3
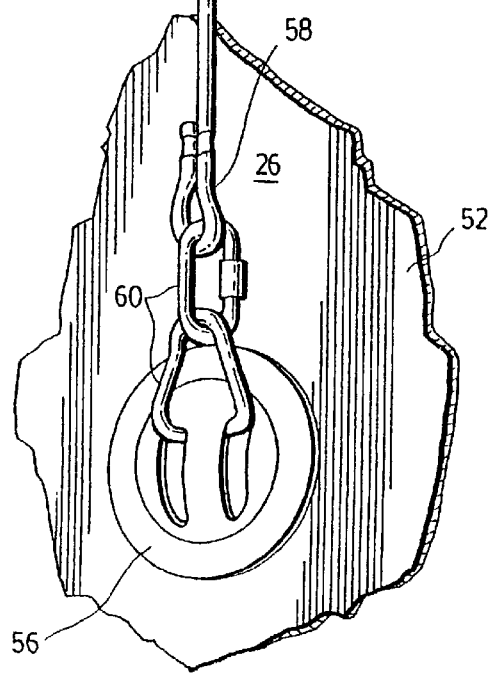

US 6,533,137 B2

CONTAINER FOR STORING AND HANDING BULK MATERIAL

FIELD OF THE INVENTION

The present invention relates to a container for storing and handling bulk material. Preferably, the present invention relates to a container for a freight vehicle or other carrier facility.

BACKGROUND OF THE INVENTION

Classical freight vehicles with hopper bottom are provided with discharge surfaces having angles of repose of approximately 45° to facilitate discharge of bulk goods in order to ensure complete unloading by gravity. However, the hopper bottom increases the construction cost of these freight vehicles. Examples of such freight vehicles are shown in U.S. Pat. Nos. 3,756,469 and 4,092,051.

Another proposal for lifting bulk material and creating an adequate angle of repose for optimal gravity discharge concerns collapsible bags that are inflated by blower systems. There is also known in the art, bulk unloading systems that do not require fixed hoppers nor inflatable bags. Such a bulk unloading system may be a collapsible rectangular liner having a collapsible funnel-shaped base wherein after partial discharge, the collapsible liner is manually raised by way of a winch to extend the collapsible funnel-shaped base above the angle of repose of the bulk material and thereby complete discharge of the bulk material. An example of this is shown in U.S. Pat. No. 4,541,765.

While the containers known in the art have resulted to the advancement within the present field, they do not provide a container where the discharging process of the bag is performed efficiently and is practically self-operational.

SUMMARY OF THE INVENTION

It is therefore an object of the present invention to provide a container for storing, handling and transporting bulk material that will fulfil the above mentioned needs.

In accordance with the present invention, that object is achieved with a container comprising a flexible bag having a top portion provided with at least one filling inlet for filling the bag. The flexible bag also has a bottom portion provided with a discharging outlet for discharging the bag. The container also comprises a collapsible frame for supporting and containing the bag. The collapsible frame comprises two parallel rigid members slidable with respect to a structure, the two rigid members being located mostly inside the bag for supporting the top portion thereof. Furthermore, the container comprises several resilient means connected to the collapsible frame for upwardly and resiliently biasing side walls of the bag.

The present invention is also directed to a carrier unit for a freight vehicle that comprises at least one container as defined above.

Advantageously, the present invention offers a container that is easy to use and simple to manufacture. Moreover, the container of the present invention eliminates almost any human intervention during the unloading process of the bag, thus the present invention offers a container provided with a self-discharging mechanism.

BRIEF DESCRIPTION OF THE DRAWINGS

The present invention and its advantages will be more easily understood after reading the following non-restrictive description of a preferred embodiment thereof, made with reference to the following drawings wherein:

FIG. 3 is a perspective view of a construction detail of a container according to a preferred embodiment of the invention.

DESCRIPTION OF A PREFERRED EMBODIMENT

Figure 1:
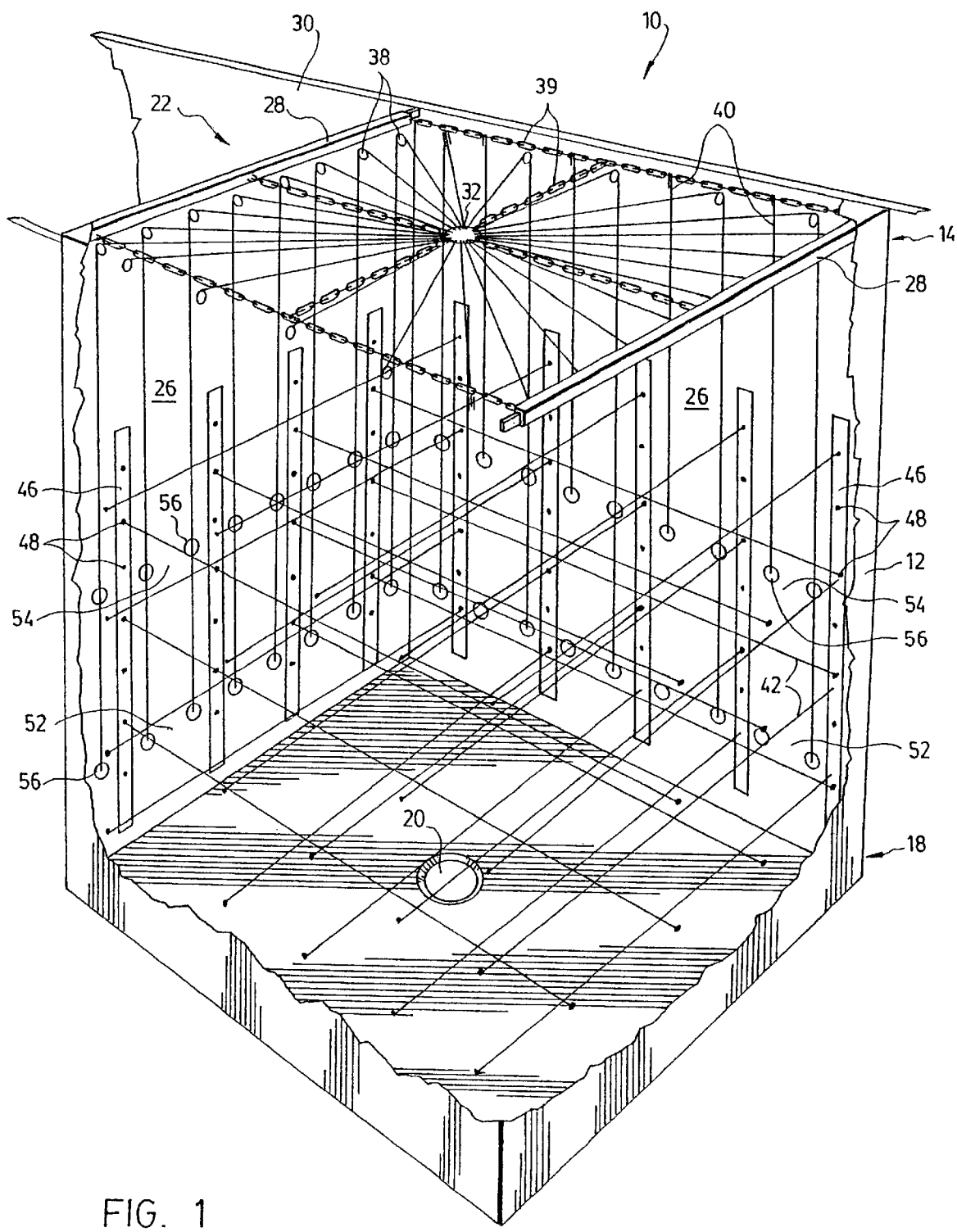
FIG. 1 is a side and top perspective view of a container according to a preferred embodiment of the invention, with parts broken away.

Referring to FIG. 1, there is shown a container 10 for storing, handling and transporting bulk material according to a preferred embodiment of the invention. It will be understood that the container 10 according to the present invention may be used for transportation of a number of bulk materials. Such bulk materials may be grains, sand, flour, carbon black or any other dry materials suitable in view of a person versed in the field.

Consequently, the container 10 of the present invention comprises a flexible bag 12 which has a top portion 14 provided with a filling inlet 16 for filling the bag 12. While the present invention contemplates employing a bag 12 with one filling inlet 16 shown in FIGS. 4 to 6, it will be understood that a bag 12 having more than one filling inlet may also be used in accordance with the present invention. The flexible bag 12 also has a bottom portion 18 provided with a discharging outlet 20 for discharging the bag 12. In accordance with the present invention, the bag 12 is made of a strong flexible fabric which is preferably hermetic and impermeable. The bag 12 may advantageously be smooth to allow easy flow of the material.

The container 10 further comprises a frame 22 for supporting and containing the bag 12. The container 10 also comprises several resilient means such as for example stretchable bands 36 to 36F and 40 shown in FIGS. 1 and 2, connected to the frame 22 for upwardly and resiliently biasing side walls 26 of the bag 12.

Figure 2:
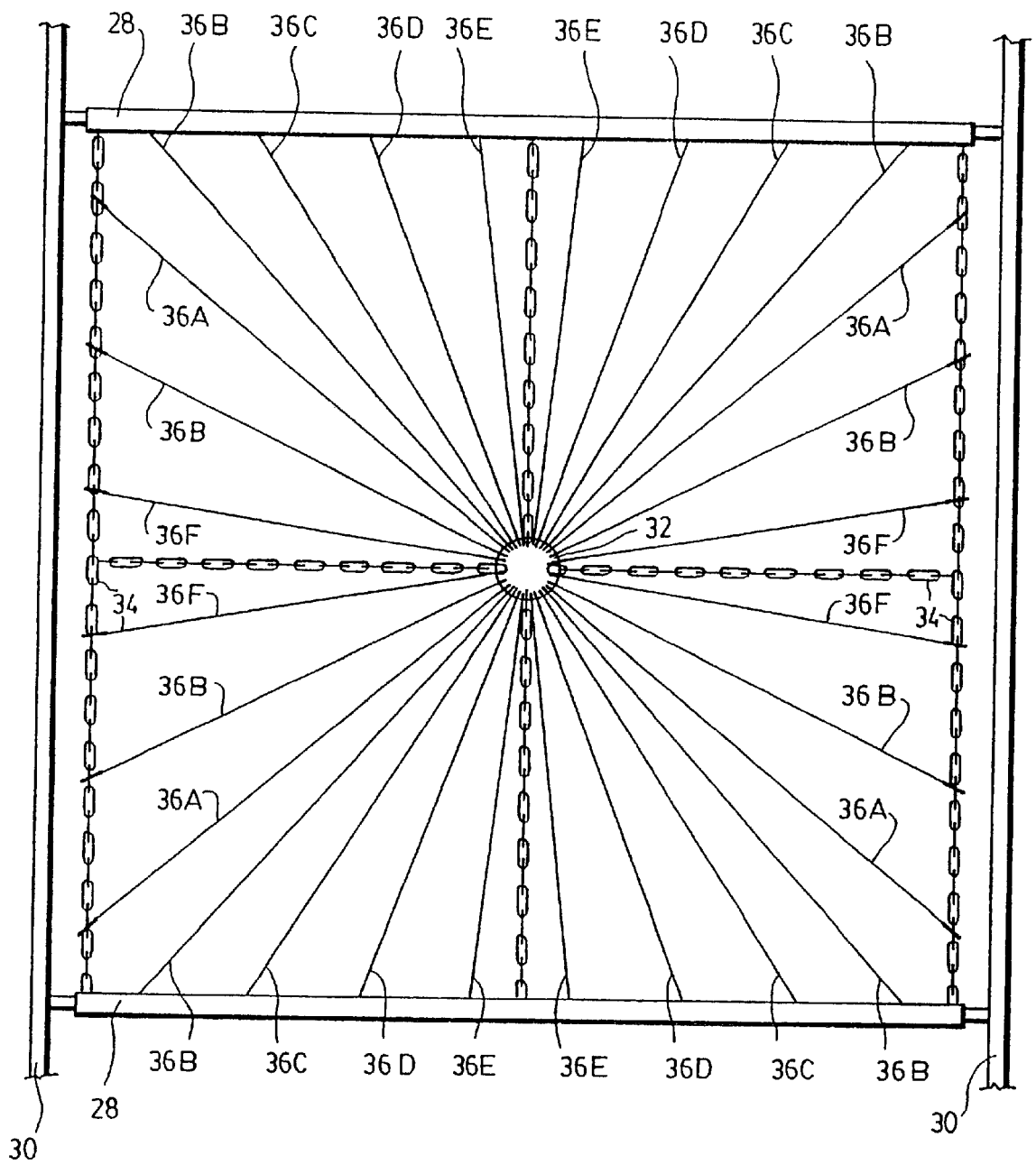
FIG. 2 is a top view of the superior elements of the container of FIG. 1.

As shown in FIGS. 1 and 2, the frame 22, which is preferably a collapsible frame 22, comprises two parallel rigid members 28 slidable with respect to a structure 30 such as walls of a carrier unit for a freight vehicle. The two rigid members 28 are located mostly inside the bag 12 for supporting the top portion 14 thereof. The collapsible frame 22 preferably comprises a ring 32 and flexible links 34 for supporting the ring 32 with respect to the two rigid members 28. The flexible links 34 are preferably made of chains. Although, any other types of links, such as for example ropes, that offers flexibility and allows the container 10 to be collapsible will suffice.

Referring now to FIG. 1 in conjunction with FIG. 3, some of the stretchable bands 36 are preferably connected to the ring 32 via pulleys 38 mounted on the rigid members 28 and the flexible links 34, whereas the remaining of the stretchable bands 40 are connected to the flexible links 34 and the rigid members 28 without any pulley. Furthermore, the flexible links 34 are preferably adapted to center the ring 32 with respect to the two rigid members 28.

Referring back to FIG. 1, the collapsible frame 22 further comprises flexible links 42 interconnecting opposite inner portions of the side walls 26 for restraining bulging thereof. As similarly mentioned above, the flexible links 42 may be any types of links which have the characteristic of being flexible, such as a chain. Nevertheless, the flexible links 42 are preferably made of cables.

The collapsible frame 22 also comprises reinforcing strips 46 secured to the inner portions of the side walls 26. Each of the strips 46 are provided with connectors 48 for connecting ends of the flexible links 42. The ends of the links 42 may be provided with any type of commonly known fasteners that will ensure a tight and secured connection to the inner portions of the side walls 26.

Figure 6:
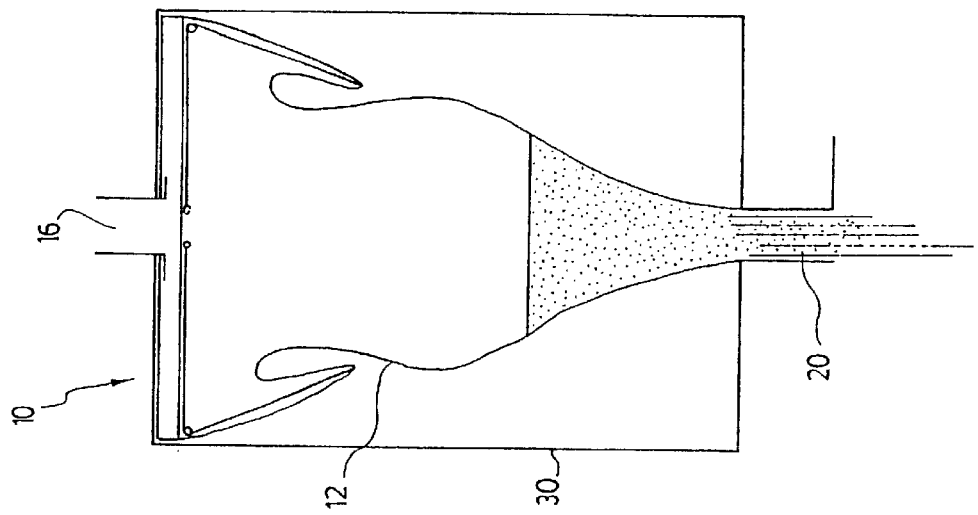
FIG. 6 is a schematic view of the container of FIGS. 4 and 5 at the end of the discharging process.
Figure 5:
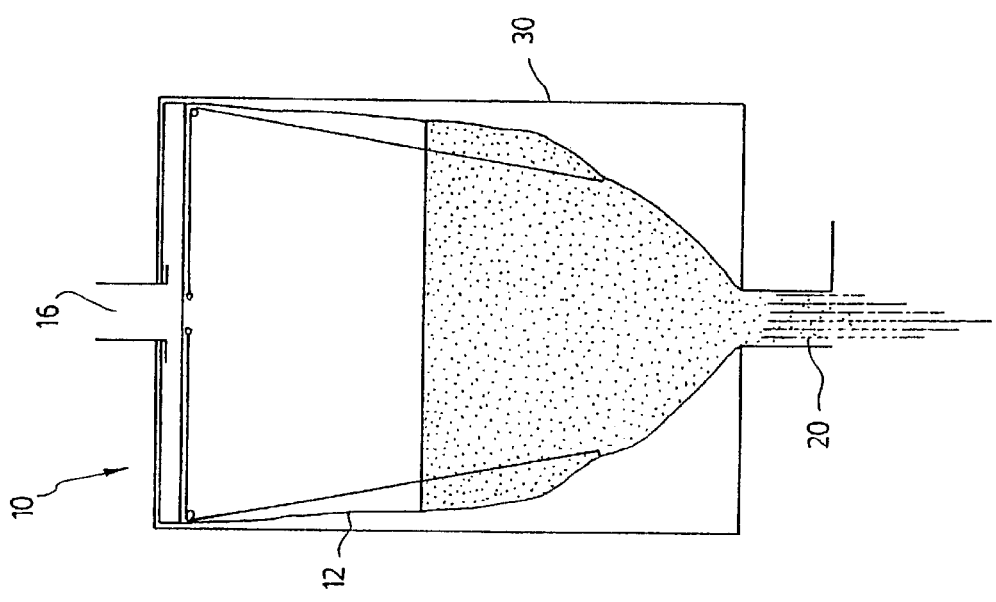
FIG. 5 is a schematic view of the container of FIG. 4 during the discharging process.
Figure 4:
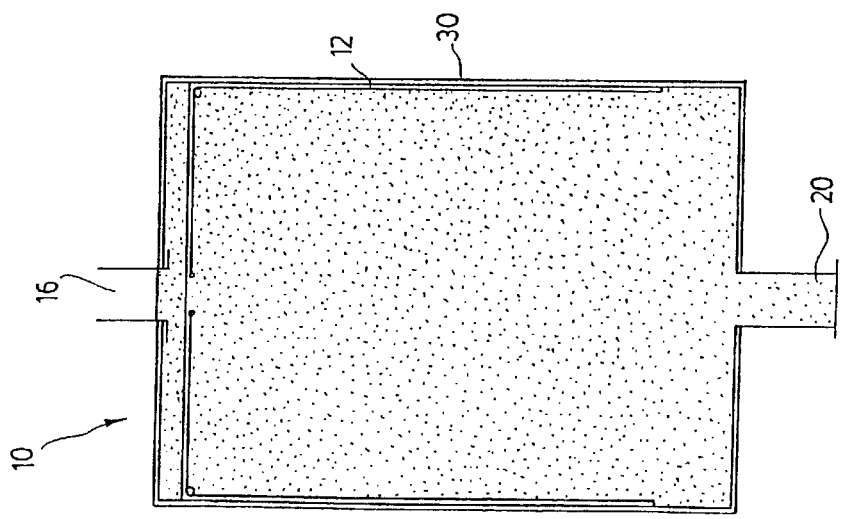
FIG. 4 is a schematic view of a container according to the present invention when filled with materials.

Some of the stretchable bands 36A to 36F are operatively anchored to first parts 52 of the inner portions of the side walls 26. These first parts 52 are located at a predetermined distance from the bottom portion 18 of the bag 12. As illustrated in FIGS. 4 to 6, the resilient action of these stretchable bands 36A to 36F anchored to the first parts 52 of the inner portions will automatically and gradually shape the bottom portion 18 of the bag 12 into a funnel-shaped bottom portion during the discharge operation process of the bag 12. The funnel-shape of the bottom portion will thus facilitate gravity discharge of the material contained in the bag 12. The preferable angle of repose obtained with a container 10 of the present invention is approximately 45° for adequately discharging the bag 12.

The remaining of the stretchable bands 40 are operatively anchored to second parts 54 of the inner portions of the side walls 26 that are higher than the first parts 52. The resilient action of these stretchable bands 40 limits the accumulation of creases of the side walls 26 during the formation of the funnel-shaped bottom portion. Limitation of these creases allow to optimally discharge the content of the bag 12 and avoid material accumulation within the creases.

The first and second parts 52 and 54 comprise anchors secured to the inner portions for anchoring ends of the stretchable bands 36A to 36F and 40. As best shown in FIG. 3, the end of the stretchable bands are provided with a loop 58 which is connected to the anchors by way of a convenient device 60, such as the combination of a snap-hook and a catch-hook. It will be understood that any type of connection may be used so as to provide a tight and a secure connection. In order to provide an optimal resilient action of the stretchable bands, the latter are preferably bungee-type of ropes such as polyester double braided ropes. These bungee ropes have the advantage of allowing the resilient action to be optimal in both warm and cold environments.

Figure 7:
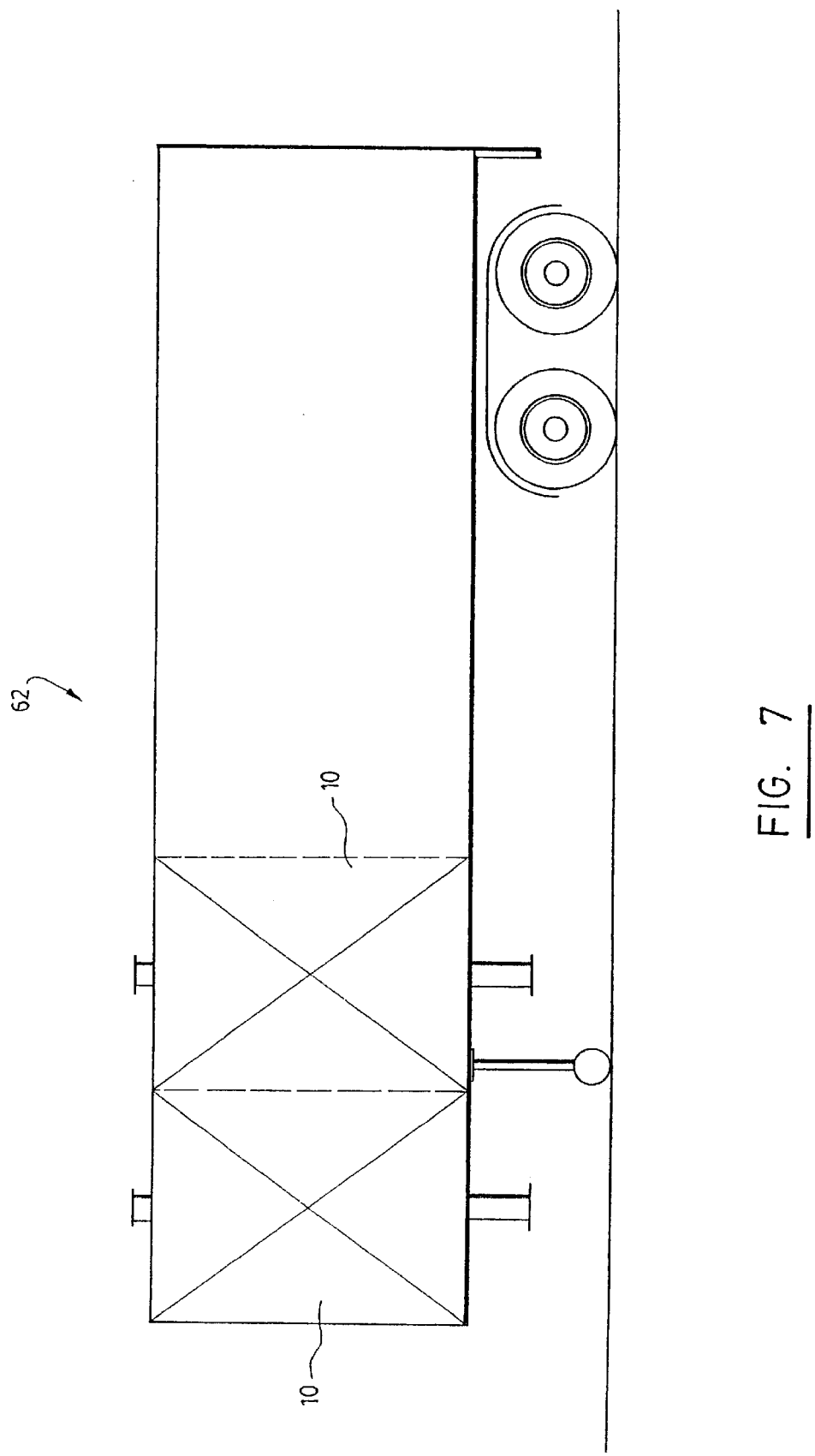
FIG. 7 is a schematic side view of a trailer-truck provided with containers of the present invention.

As can be appreciated by viewing FIG. 7, the present invention also contemplates of providing a carrier unit 62 for a freight vehicle with at least one container 10 of the present invention. Such a carrier unit 62 may be a trailer truck, a train-wagon or the like. The trailer truck may be equipped with a rail system by which the container 10 of the present invention may be operatively slidable within the trailer truck in order to store the containers 10 in a storage compartment while not in use.

EXAMPLE

According to a preferable application, the container 10 as shown in the Figures is adapted to receive dry materials with a weight ranging approximately between 13 lbs$^3$ to 47 lbs$^3$ with respect of the volume of the bag, which is approximately 350 feet$^3$.

The following Table resumes the dimension of the different parts of the container 10 as shown in FIGS. 1 and 2.

| Part of the container | Dimension |
| --- | --- |
| The bag 12 | 104 inches high |
| The rigid member 28 | 8 feet |
| The first flexible links which are chains 34 | 6 feet with a deformation factor at their center of about 4 inches, for those that interconnect the rigid members, about 46 inches for those anchored to the rigid members and about 34 inches for those anchored to the 6 feet chains |
| Band 36A | 72 ¾ inches |
| Band 36B | 72 inches |
| Band 36C | 66 ¾ inches |
| Band 36D | 61 ½ inches |
| Band 36E | 58 inches |
| Band 36F | 71 ½ inches |
| Ring 32 | Diameter of 4 inches |
| Discharging outlet 20 | Diameter of 10.750 mm |
| Anchoring means 56 of the first parts 52 of the inner portions of the side walls 26 | Disposed at 24 inches relative to the bottom of the bag, and spaced apart by 12 inches |
| Anchoring means 56 of the second parts 54 of the inner portions of the side walls 26 | Disposed at 72 inches relative to the bottom of the bag, and spaced apart by 12 inches |

The stretchable bands 36A to 36F in relation with the other parts of the bag 12 are calibrated in order to sustain 150 psi per anchoring means 56 at 24 inches relative to the bottom of the bag 12. The stretchable bands have a length selected so that it provides an elongation factor of about 75%. The pulleys 38 are fixed to the rigid members 28 or the first flexible links 34 at a specific angle so as to provide an optimal resilient action.

For this specific application, any variation to the above mentioned characteristic may cause damage to the different parts of the bag 12, and therefore be detrimental to the system itself. A person skilled in the art will understand that the characteristics of the different elements of the container 10 have to be adapted in view of one another for a given application.

Although a preferred embodiment of the present invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A container for storing, handling and transporting bulk material, comprising:
    a flexible bag having a top portion provided with at least one filling inlet for filling the bag, and a bottom portion provided with a discharging outlet for discharging the bulk material from the bag;
    a frame for supporting and containing the bag, wherein the frame is a collapsible frame comprising two parallel rigid member slidable with respect to a structure, the two rigid members being located mostly inside the bag for supporting the top portion thereof; and
    several resilient means connected to the frame for upwardly and resiliently biasing side walls of the bag.
2. A container according to claim 1, wherein the collapsible frame comprises:
    a ring; and first flexible links for supporting the ring with respect to the two rigid members, some of the resilient means being connected to the ring via pulleys mounted on the rigid members and the first flexible links, and the remaining of the resilient means being connected to the flexible links and the rigid members.

3. A container according to claim 2, wherein the collapsible frame further comprises second flexible links interconnecting opposite inner portions of the side walls for restraining bulging thereof.

4. A container according to claim 2, wherein said some of the resilient means comprise a plurality of stretchable bands operatively anchored to first parts of the inner portions of the side walls, located at a predetermined distance from bottom portion of the bag.

5. A container according to claim 4, wherein said remaining of the resilient means comprise a plurality of stretchable bands operatively anchored to second parts of the inner portions of the side walls that are higher than the first parts.

6. A container according to claim 5, wherein first and second parts comprise anchoring means secured to the inner portions for anchoring ends of the stretchable bands.

7. A container according to claim 3, comprising reinforcing strips secured to the inner portions of the side walls, each of the strips being provided with connection means for connecting ends of the second flexible links.

8. A container according to claim 2, wherein the first flexible links are adapted to center the ring with respect to the two rigid members.

9. A container according to claim 8, wherein the first flexible links are chains.

10. A container according to claim 7, wherein the second flexible links are cables.

11. A container according to claim 5, wherein the stretchable bands are resilient ropes.

12. A container according to claim 11, wherein the resilient ropes are polyester double braided ropes.

13. A carrier unit for a freight vehicle, the carrier unit comprising at least one container for storing, handling and transporting bulk material, each container comprising:

a flexible bag having a top portion provided with a filling inlet for filling the bag, and a bottom portion provided with a discharging outlet for discharging the bulk material from the bag;

a frame for supporting and containing the bag, wherein, for each container, the frame is a collapsible frame comprising two parallel rigid members slidable with respect to a structure, the two rigid members being located mostly inside the bag for supporting the top portion thereof; and several resilient means connected to the frame for upwardly and resiliently biasing side walls of the bag.

14. A carrier unit according to claim 13, wherein, for each container, the collapsible frame comprises:

a ring;

first flexible links for supporting the ring with respect to the two rigid members, some of the resilient means being connected to the ring via pulleys mounted on the rigid members and the first flexible links, and the remaining of the resilient means being connected to the flexible links and the rigid members.

15. A carrier unit according to claim 14, wherein, for each container, the collapsible frame further comprises second flexible links interconnecting opposite inner portions of the side walls for restraining bulging thereof.

16. A carrier unit according to claim 14, wherein, for each container, the first flexible links are chains.

17. A carrier unit according to claim 15, wherein, for each container, the second flexible links are cables.

* * * * *